A. R. MIDDLETON.
WATER TIGHT BEARING FOR PROPELLER SHAFTS AND THE LIKE.
APPLICATION FILED AUG. 28, 1917.

1,272,834. Patented July 16, 1918.

Inventor
Arthur R. Middleton
by Spear, Middleton, Donaldson & Spear
Atty's.

UNITED STATES PATENT OFFICE.

ARTHUR R. MIDDLETON, OF WAYSIDE, MARYLAND.

WATER-TIGHT BEARING FOR PROPELLER-SHAFTS AND THE LIKE.

1,272,834.  Specification of Letters Patent.  Patented July 16, 1918.

Application filed August 28, 1917. Serial No. 188,665.

*To all whom it may concern:*

Be it known that I, ARTHUR R. MIDDLETON, a citizen of the United States, and resident of Wayside, Maryland, have invented certain new and useful Improvements in Water-Tight Bearings for Propeller-Shafts and the like, of which the following is a specification.

One object of my invention is to provide in connection with a bearing for propeller shafts, means for preventing the passage of water or fluid through the bearing, and while accomplishing this object I aim to avoid the use of the ordinary packing or stuffing box which requires frequent renewal.

The invention consists in the features and combination and arrangement of parts hereinafter described and particularly pointed out in the claim.

In the accompanying drawings.

Figure 1:
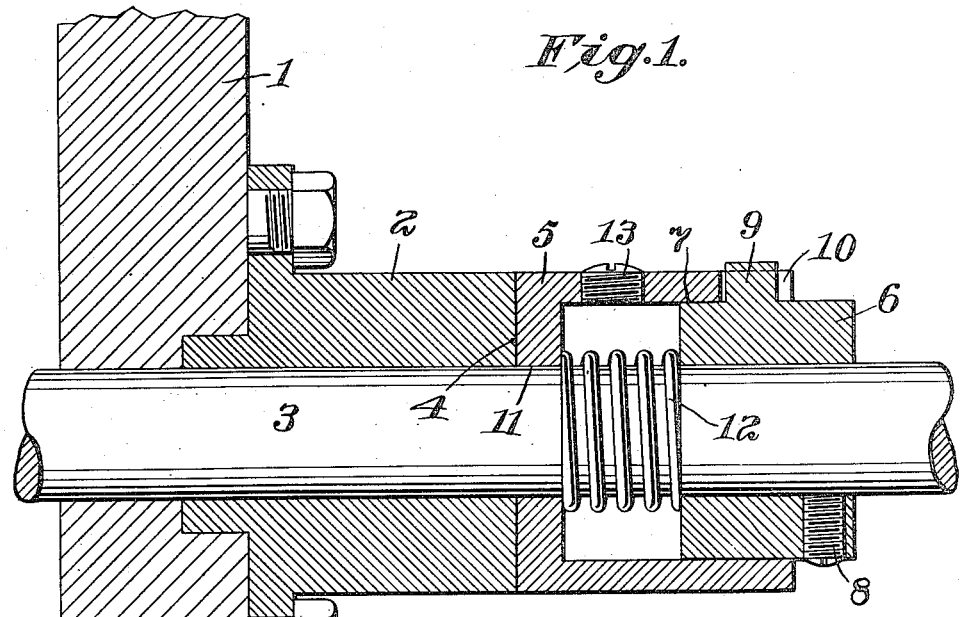
Figure 1 is a sectional view of a bearing having my improvement associated therewith.
Figure 2:
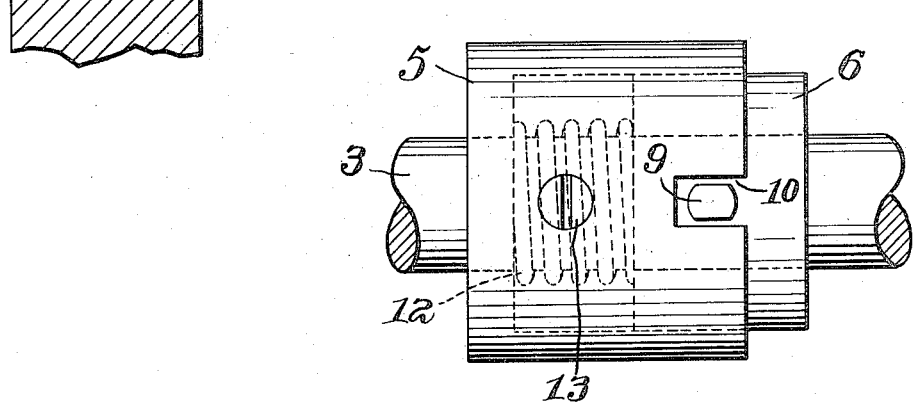
Fig. 2 is a plan view.

In these drawings 1 indicates a portion of the stern post, on the outer side of which a bearing member 2 is mounted, suitable bolts being used for this purpose. The propeller shaft 3 turns in this bearing. The outer face of the bearing at 4 is plane and against this a member 5 bears, which, for convenience, I will refer to as the driven member. This has a plane face adapted to run upon the plane outer face of the bearing 2 to make a close water-tight fit. This member may assume different forms, but in the particular construction shown it is in the form of a shell open at its rear end, and within it at its rear end it receives the member 6, which, for convenience, I will refer to as the driving member. This member 6 may also assume different forms, but in the particular construction shown it consists of a cylindrical block of a diameter to make a close water-tight fit at 7 with the interior surface of the cylindrical shell of the driven member 5. This driving member 6 is rigidly secured to the propeller shaft by suitable means, an example of which is represented by the screw 8. The driving member has a splined connection with the driven member, and while this may assume various forms I show as an example an extension or pin 9 projecting from the driving member into a notch 10 in the rear edge of the shell 5, this notch being longer than the width of the pin to allow relative movement of the pin in relation to the shell 5. The driven member 5 is not fixed rigidly to the propeller shaft as is the member 6, though it has a close water-tight fit upon said shaft at the point 11, this being the preferable construction, though not absolutely essential.

A spring 12 is interposed between the face of the driving block or member 6 and the inner face of the driven member 5, so that the said driven member 5 will be held at all times with its plane front face in firm contact with the rear plane face of the bearing 2, so that the face of the shell runs in contact with the face of the bearing throughout the extent of these faces.

In the operation of the device the rotation of the propeller shaft will carry with it the block 6 which is fixed thereto, and this block in turn will rotate the driven member or shell 6, this being due to the lug 9 bearing against the wall of the notch or slot 10, and during this rotation of the driving and driven members the spring 12 will force the driven member to bear with its front plane face upon the plane face of the bearing 2 to prevent the passage of water at this point.

Any slight longitudinal or axial vibration of the propeller shaft 3 will be permitted and compensated for by the spring interposed between the driving and driven members, this spring serving to keep the driven member bearing with a close running fit against the boss or bearing 2, notwithstanding the fact that the shaft 3 may be vibrating or shifting in the direction of its axis. The notch or slot 10 is somewhat wider than the thickness of the lug or pin 9, so that there will be no possibility of this pin becoming locked or fixed in the said slot 10. It is, of course, essential that the connection at this point be maintained loose so that any vibration of the shaft 3 longitudinally cannot be communicated to the shell or driven member 5 through this connection 9, 10, it being obvious that should the shell 5 be vibrated by the vibration of the shaft water or fluid could enter between the faces of the driven member and the bearing 2, but with the loose construction shown and with the spring 12 interposed between the driving and driven members the face of the shell 5 will be maintained in close running fit with the end face of the bearing and a water-tight joint will be provided in this way at this point.

As before intimated, a close sliding fit is provided between the driving and driven members at 7. The construction illustrated and described is presented in an exemplary way as illustrative of the principle of my invention and not in a limiting sense.

The interior of the shell 5 may be packed with grease or other lubricant, for which purpose a movable plug is provided at 13. This grease will be held in place because of the tight fit between the driving and the driven members.

What I claim is:—

In combination a revoluble propeller shaft, a fixed bearing, a driving member fixed on the shaft, a driven member in the form of a shell open at the rear and having the plane front face of its end head contacting with a running fit with the plane face of the bearing and having also a close fit with the shaft, a spring for pressing the driven member against said plane faced bearing member and a loose splined connection between the driving member and the shell of the driven member, permitting the driving member to have axial vibration without affecting the driven member, said driven member having a close sliding fit with the peripheral surface of the driving member, substantially as described.

In testimony whereof, I affix my signature.

ARTHUR R. MIDDLETON.